US012776194B2

(12) United States Patent
Johnson et al.

(10) Patent No.: US 12,776,194 B2
(45) Date of Patent: Oct. 27, 2026

(54) WALL-MOUNTED SELF-CHECKOUT SYSTEM

(71) Applicant: TOSHIBA GLOBAL COMMERCE SOLUTIONS, INC., Durham, NC (US)

(72) Inventors: Brad M. Johnson, Raleigh, NC (US); William L. Dungan, Cary, NC (US)

(73) Assignee: TOSHIBA GLOBAL COMMERCE SOLUTIONS, INC., Durham, NC (US)

( * ) Notice: Subject to any disclaimer, the term of this patent is extended or adjusted under 35 U.S.C. 154(b) by 21 days.

(21) Appl. No.: 18/975,799

(22) Filed: Dec. 10, 2024

(65) Prior Publication Data

US 2026/0162506 A1 Jun. 11, 2026

(51) Int. Cl.
*G06Q 20/20* (2012.01)
*G01C 9/02* (2006.01)
*G07G 1/00* (2006.01)

(52) U.S. Cl.
CPC ............. *G07G 1/0009* (2013.01); *G01C 9/02* (2013.01); *G06Q 20/20* (2013.01)

(58) Field of Classification Search
CPC ......... G07G 1/0009; G01C 9/02; G06Q 20/20
See application file for complete search history.

(56) References Cited

U.S. PATENT DOCUMENTS

| | | | | |
|---|---|---|---|---|
| 6,085,972 A * | 7/2000 | Wright | G07G 1/0018 235/375 |
| 10,747,262 B1 * | 8/2020 | Chiu | F16M 11/38 |
| 2003/0120547 A1 * | 6/2003 | Walter | G07G 1/0054 705/16 |
| 2006/0080177 A1 * | 4/2006 | Walter | G06Q 20/20 705/16 |
| 2018/0314863 A1 * | 11/2018 | Gao | G06K 7/1456 |
| 2021/0365990 A1 * | 11/2021 | Lau | G06Q 30/02 |
| 2025/0305869 A1 * | 10/2025 | Nack | G01G 23/16 |

FOREIGN PATENT DOCUMENTS

| | | | | |
|---|---|---|---|---|
| CN | 114187701 A * | 3/2022 | G06Q 30/0237 |
| CN | 221668353 U * | 9/2024 | |
| WO | WO-2023287317 A1 * | 1/2023 | G07F 19/00 |

* cited by examiner

*Primary Examiner* — Ashford S Hayles
(74) *Attorney, Agent, or Firm* — Patterson + Sheridan, LLP; Gero G. McClellan

(57) ABSTRACT

A wall-mounted self-checkout system is provided. In one aspect, a wall-mounted self-checkout system includes a housing, a counter having a horizontal panel and a vertical panel connected thereto, a shelf mounted to the vertical panel, and a tower to which a display screen is mounted. The wall-mounted self-checkout system also includes a computing system arranged to perform an operation, including determining, based at least in part on received data, that at least one of: a tilt angle of the wall-mounted self-checkout system achieves a predetermined tilt threshold; or a slant angle of the wall-mounted self-checkout system achieves a predetermined slant threshold; and performing a control action in response to determining at least one: the tilt angle has achieved the predetermined tilt threshold; or the slant angle has achieved the predetermined slant threshold.

20 Claims, 9 Drawing Sheets

WALL-MOUNTED SELF-CHECKOUT SYSTEM

BACKGROUND

Many retail stores offer buyers the option to purchase items at self-service kiosks. Self-service kiosks have become desirable to both buyers and retailers. For buyers, the kiosks offer reduced wait times as compared to using a cashier lane. Retailers can benefit from increased checkout efficiency. During a checkout transaction, a buyer can scan product barcodes for each product and can place them on a platform to be weighed and/or monitored during the transaction. A display screen can provide helpful information to the buyer, such as the cost of the items scanned, whether an item is on sale or discounted, a weight of an item, etc. In some instances, a kiosk can be impacted by an event that can cause the kiosk to operate less than optimally.

DETAILED DESCRIPTION

Figure 1:
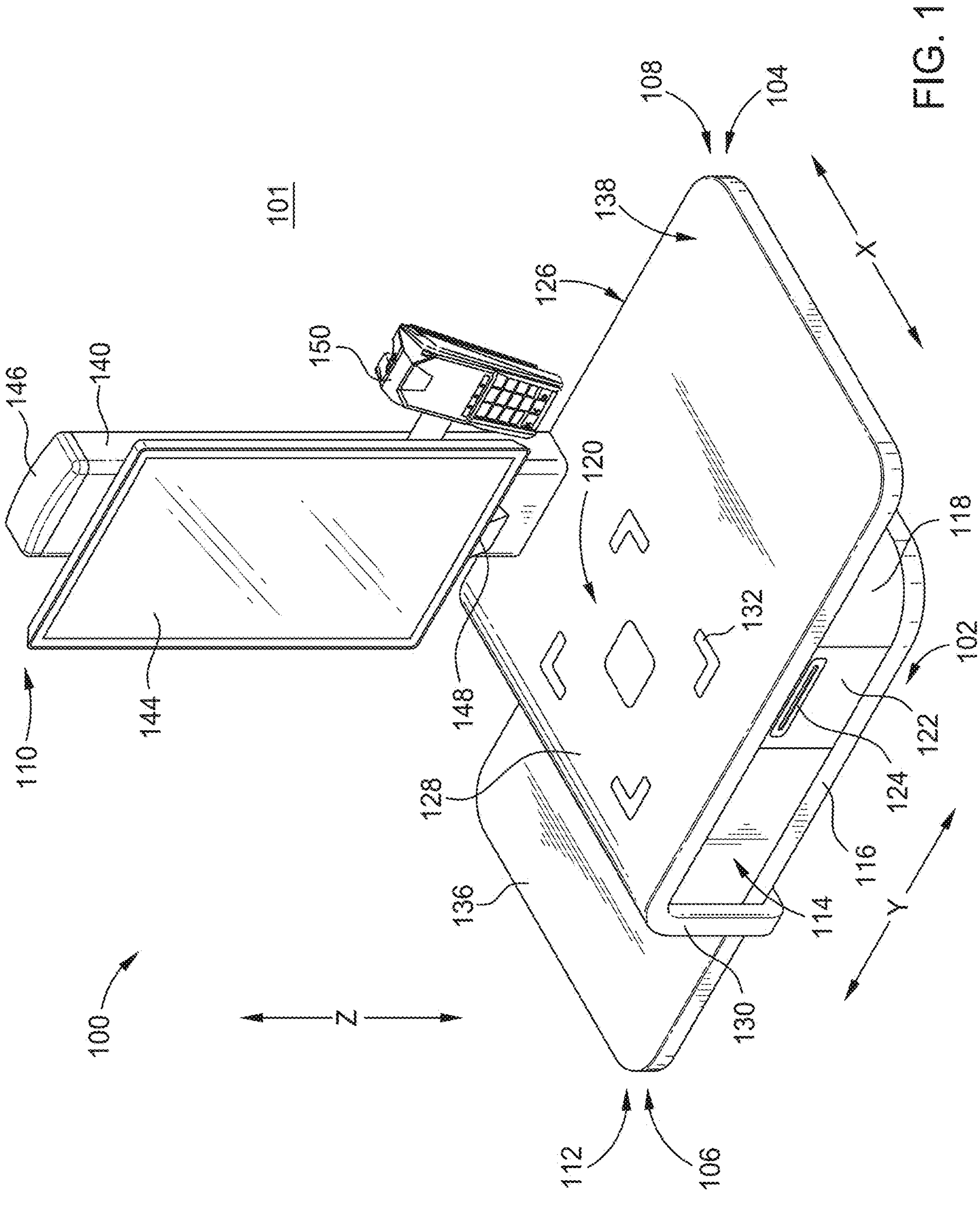
FIG. 1 depicts a perspective view of a wall-mounted self-checkout system, according to one or more aspects of the present disclosure.

A wall-mounted self-checkout system can be mounted to a wall, such as cantilevered from the wall. In some instances, the wall-mounted self-checkout system can be impacted by a significant force. For example, a shopping cart full of groceries can strike the unit, applying a relatively large force thereto. As another example, a person can jump onto or sit on a shelf of the wall-mounted self-checkout system. While such wall-mounted self-checkout systems are designed and installed to withstand significant forces, in some cases, a wall-mounted self-checkout system can be caused to tilt or slant. Tilting and/or slanting of the wall-mounted self-checkout system can affect the sensors and measurement units thereof, and can potentially present a safety issue.

Wall-mounted self-checkout systems disclosed herein can include features for detecting and addressing such tilt and/or slant events. In one or more examples, a wall-mounted self-checkout system can include a housing, a counter having a horizontal panel and a vertical panel connected thereto, a shelf mounted to the vertical panel, a tower extending upwards relative to the counter and having one or more mounts for mounting the wall-mounted self-checkout system to a wall, and a display screen mounted to the tower. The wall-mounted self-checkout system can also include a computing system arranged to perform an operation, including an operation to detect and address tilt and/or slant events. In at least one example, the operation can include determining that a tilt angle of the wall-mounted self-checkout system achieves a predetermined tilt threshold and/or that a slant angle of the wall-mounted self-checkout system achieves a predetermined slant threshold. Captured image data, sensor data, etc. can be used to determine the tilt and/or slant angle of the wall-mounted self-checkout system. The operation can further include performing a control action in response to determining that the tilt angle has achieved the predetermined tilt threshold and/or that the slant angle has achieved the predetermined slant threshold. Example control actions can include, without limitation, shutting down the lane with a lane blocker, communicating the tilt and/or slant event to an operator (e.g., a sales associate), changing the mode of the wall-mounted self-checkout system from a normal mode to a stand-by mode or a shutdown mode, and automatically performing a recalibration process for one or more load cells. Thus, such a wall mounted self-checkout system can be arranged to detect and address tilt and/or slants events.

In some further aspects, tilt and/or slant events can be monitored and addressed for one or more components of the wall-mounted self-checkout system, such as an input shelf, which can be cantilevered from the remainder of the unit.

As used herein, the “tilt angle”, “tilting”, or “tilt” of an object is taken in reference to an angle or orientation of the wall-mounted self-checkout system relative to a horizontal reference plane that is perpendicular to a wall to which the wall-mounted self-checkout system is mounted. The “slant angle”, “slanting”, or “slant” of an object references an angle or orientation of the wall-mounted self-checkout system relative to a vertical reference plane that is parallel to, or coplanar with, the wall to which the wall-mounted self-checkout system is mounted.

Figure 2:
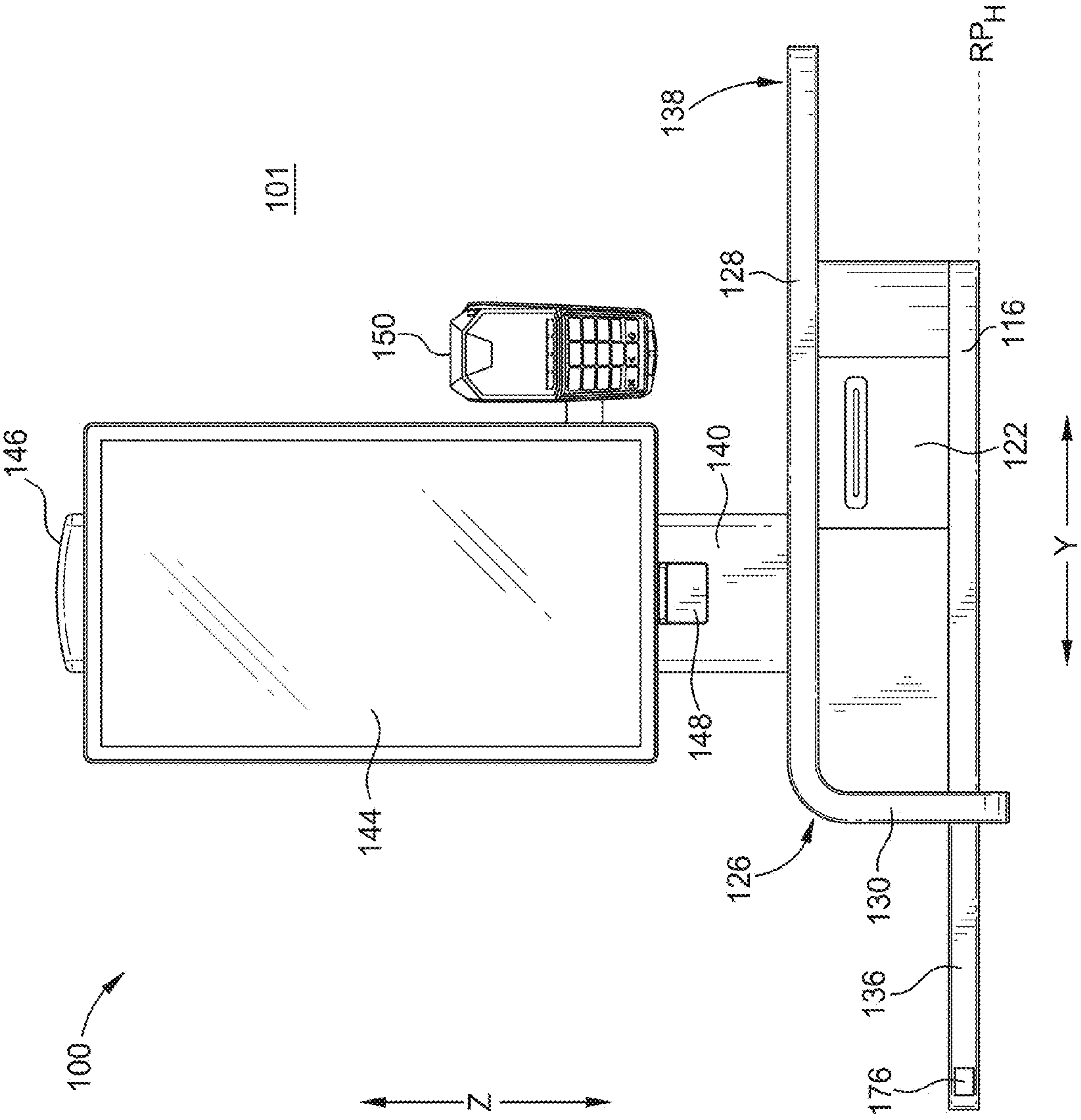
FIG. 2 depicts a front view of the wall-mounted self-checkout system of FIG. 1, with the wall-mounted self-checkout system oriented without tilt or slant.

With reference now to FIGS. 1 and 2, FIG. 1 depicts a perspective view of a wall-mounted self-checkout system 100, according to one or more aspects of the present disclosure. FIG. 2 depicts a front view of the wall-mounted self-checkout system 100. The wall-mounted self-checkout system 100 can also be referred to as a self-service kiosk or a checkout terminal. For reference, the wall-mounted self-checkout system 100 defines an X-direction, a Y-direction, and a Z-direction, which are mutually perpendicular to one another. In one or more examples, the X-direction is a transverse direction, the Y-direction is a lateral direction, and the Z-direction is a vertical direction. The wall-mounted self-checkout system 100 can be mounted to a wall 101. In FIG. 1, the wall 101 extends in a plane perpendicular to the X-direction, or stated differently, in a YZ plane. In one or more examples, the wall-mounted self-checkout system 100 does not physically touch the ground.

The wall-mounted self-checkout system 100 has a front 102 and a back 104, a first side 106 and a second side 108, and a top side 110 and a bottom side 112. The wall-mounted self-checkout system 100 includes a housing 114. The housing 114 has a base 116 and a plurality of sidewalls 118 extending upward from the base 116. The housing 114 defines an interior in which various components can be disposed, such as an item scanner 120 and a printer. The housing 114 includes a printer drawer 122 that is movable between a retracted position (shown in FIG. 1) and a deployed position. In the deployed position, the printer drawer 122 is moved open, e.g., along the X-direction, to allow access to a printer engine of the printer, to resupply paper, etc. The printer drawer 122 has a receipt dispenser 124, which can dispense printed receipts, and in at least one example, can be illuminated to signal to a user that a receipt has been printed.

The wall-mounted self-checkout system 100 also includes a counter 126 having a horizontal panel 128 and a vertical panel 130 connected thereto, e.g., by a curved transition. In this regard, the counter 126 has a "waterfall" configuration. The horizontal panel 128 is arranged in an XY plane while the vertical panel 130 is arranged in a YZ plane in the depicted example of FIG. 1. The horizontal panel 128 is seated on the housing 114 and the vertical panel 130 encloses a side of the housing 114. The horizontal panel 128 can include a plurality guidance lights 132 that can be illuminated to guide a user to place items into a "buy zone" so that the items can be scanned by the item scanner 120, which as noted, can be disposed within the housing 114. In one or more examples, the item scanner 120 can include one or more load cells 134 (FIG. 3), e.g., for measuring a weight of items placed within the buy zone.

In one or more examples, an input shelf 136 is cantilevered from the vertical panel 130, e.g., as shown in FIG. 1 (see also FIG. 2). The input shelf 136 can be mounted to the vertical panel 130, e.g., by way of tabs and one or more fasteners. The tabs of the input shelf 136 can be inserted into recesses of the vertical panel 130 and can be bolted thereto or to the housing 114, such as in the interior of the housing 114. Additionally or alternatively, the input shelf 136 can be mounted to the vertical panel 130 by other attachment means, such as by an adhesive. In yet further examples, the input shelf 136 can be integrally formed with the counter 126, making the counter 126 and the input shelf 136 a unitary monolithic component. Such a component can be formed by an additive manufacturing technique, such as 3D printing. The input shelf 136 can provide a place for a user to place items prior to registering or scanning items for purchase. In at least one example, the vertical panel 130 is arranged, at least in part, below a bottom surface of the input shelf 136 (see FIG. 2). In at least one example, the input shelf 136 is arranged at a same height as the base 116, e.g., along the Z-direction (see FIG. 2).

In addition to the input shelf 136, at least a portion of the horizontal panel 128 is cantilevered from the rest of the horizontal panel 128 to form an output shelf 138. The output shelf 138 can provide a place for a user to bag or set items after purchase. As shown in FIG. 1 (see also FIG. 2), the housing 114 does not extend underneath the output shelf 138.

Figure 6:
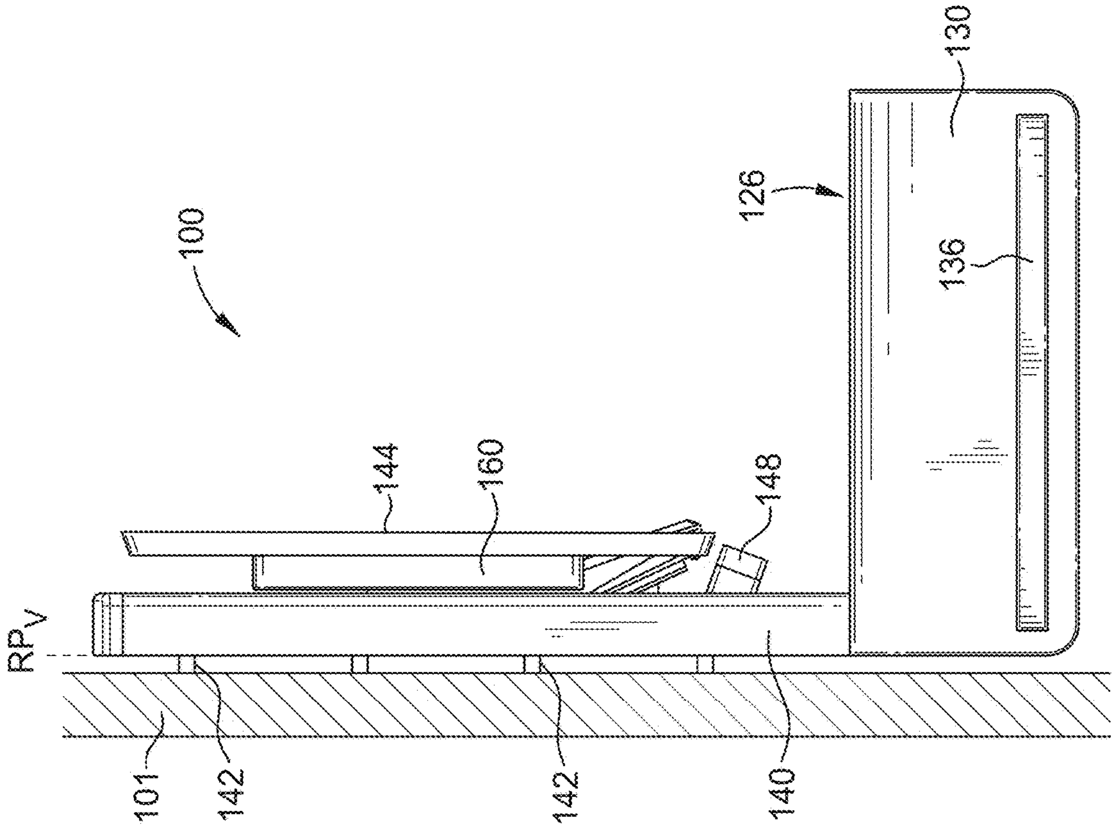
FIG. 6 depicts a side view of the wall-mounted self-checkout system of FIG. 1, with the wall-mounted self-checkout system oriented without tilt or slant.
Figure 8:
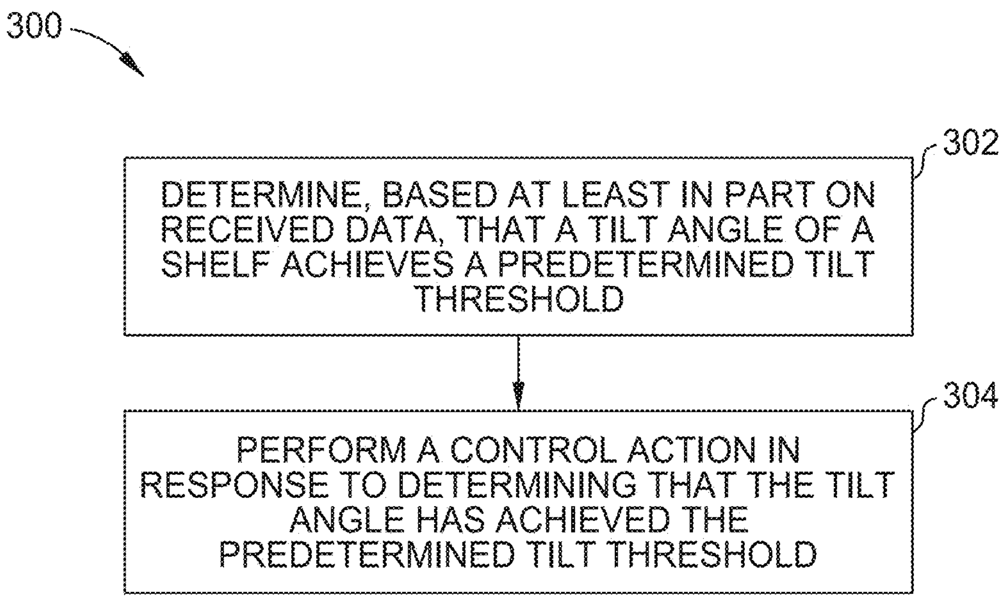
FIG. 8 is a flow diagram for implementing an operation for detecting and addressing a tilt event associated with a shelf of a wall-mounted self-checkout system, according to one or more aspects of the present disclosure.

The wall-mounted self-checkout system 100 further includes a tower 140 extending upwards relative to the counter 126. The tower 140 can be mounted to the counter 126, to the housing 114, or a combination thereof. The tower 140 has one or more mounts 142 (FIGS. 6 and 7) for mounting the wall-mounted self-checkout system 100 to the wall 101. The mounts 142 can include hooks, rods, fasteners, mounting plates, and/or other mounting devices. A display screen 144 is mounted to the tower 140. The display screen 144 can present helpful information to a user, such as the cost of the items scanned, whether an item is on sale or discounted, a weight of an item, etc. The tower 140 can also include lane light 146 arranged at a top side thereof. The lane light 146 can be controlled to indicate a status of the wall-mounted self-checkout system 100, e.g., green for ready for use/open, red for closed, yellow for occupied, etc. A camera 148 is mounted to the tower 140, e.g., below the display screen 144. In at least one example, the camera 148 can capture images of the wall-mounted self-checkout system 100, items in and near the buy zone, etc. The camera 148 can also be used to capture images of a user present at the wall-mounted self-checkout system 100, e.g., for capturing biometric data. A payment terminal 150 can be mounted to a side wall of the tower 140. The payment terminal 150 can include a display, keypad, a card reader, near field communication (NFC) beacon, etc. for facilitating payment processing during a transaction.

Figure 3:
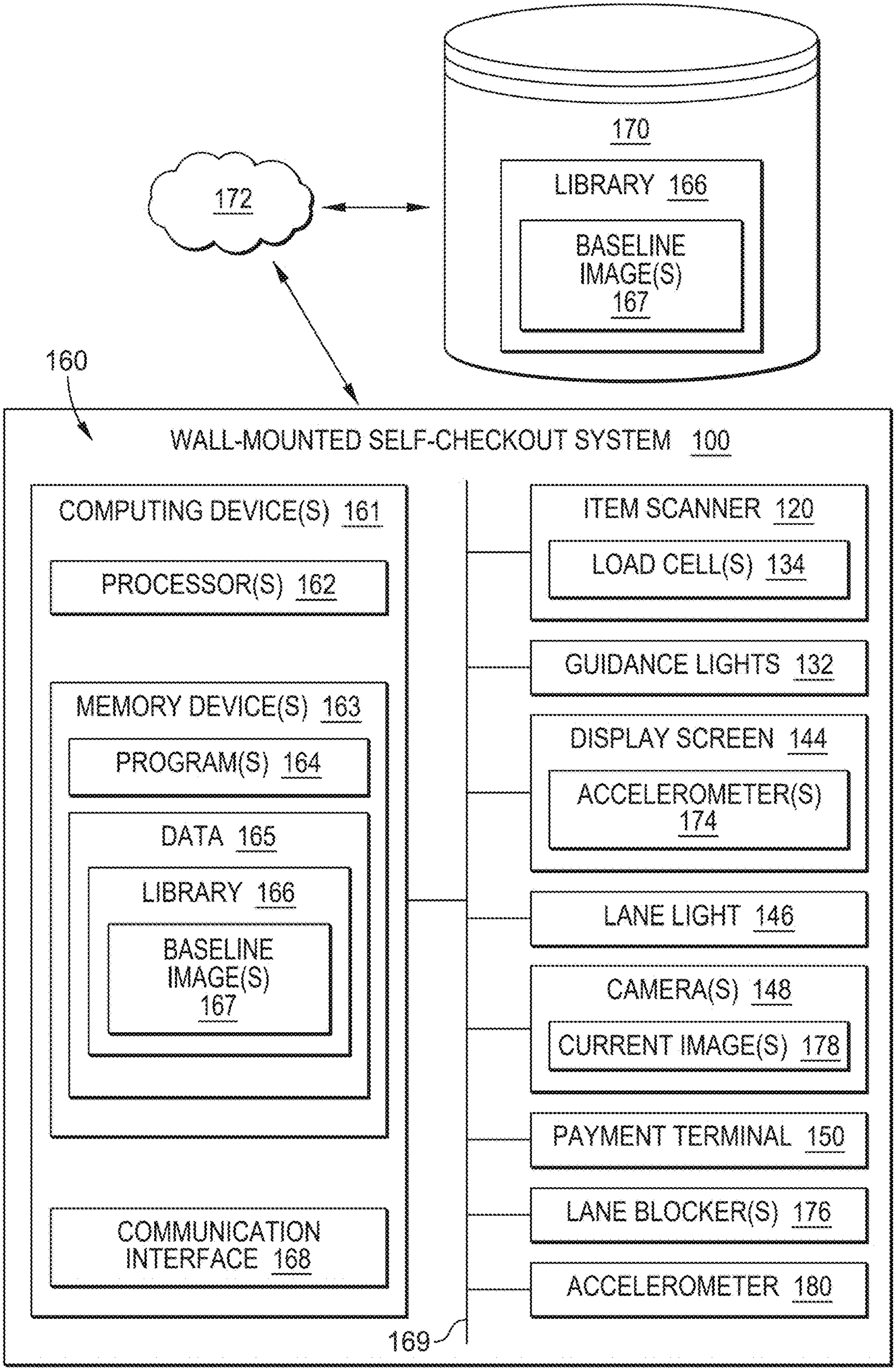
FIG. 3 is a schematic representation of the wall-mounted self-checkout system of FIG. 1.
Figure 4:
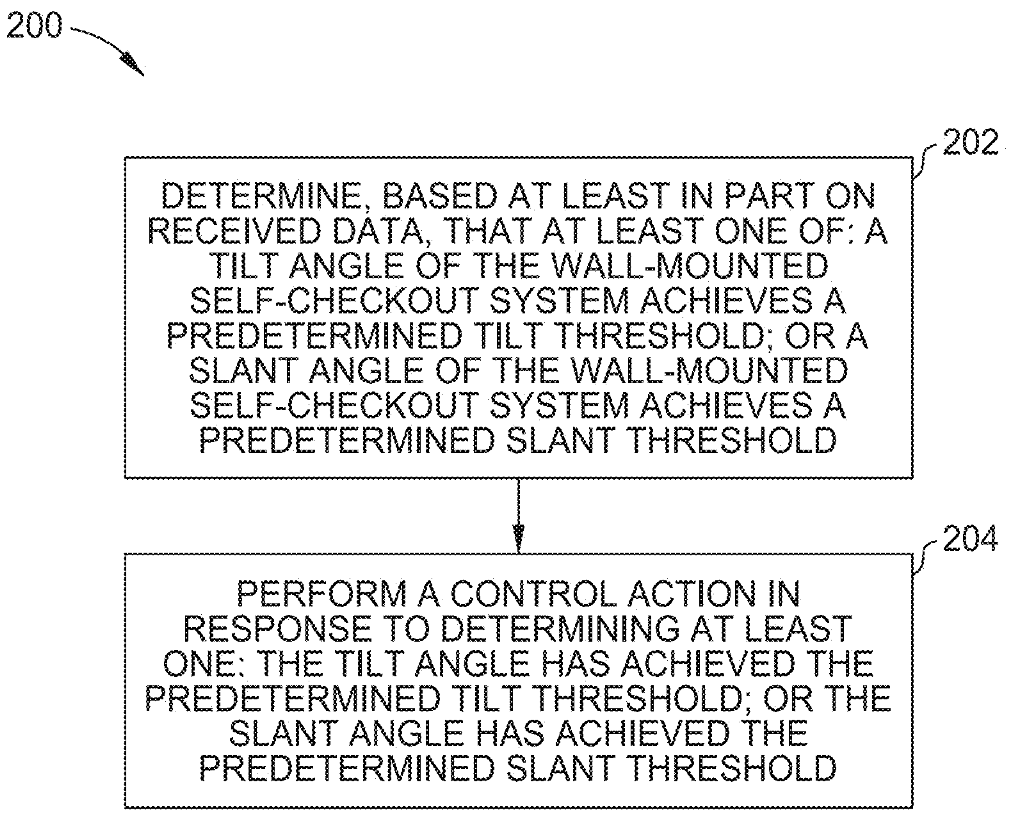
FIG. 4 is a flow diagram for implementing an operation for detecting and addressing a tilt and/or slant event associated with a wall-mounted self-checkout system, according to one or more aspects of the present disclosure.

FIG. 3 is a schematic representation of the wall-mounted self-checkout system 100. As illustrated in FIG. 3, the wall-mounted self-checkout system 100 can include a computing system 160. The computing system 160 can include one or more computing devices, such as computing device 161. The computing device 161 can include one or more processors 162 and one or more memory devices 163 storing one or more programs 164, which, when executed by any combination of the one or more processors 162, causes the one or more processors 162 to perform an operation, including an operation to detect and address tilt and/or slant events. The one or more memory devices 163 can also store data 165. The data 165 can include, among other things, a library 166. The library 166 can include baseline images 167.

In some examples, the library 166 can be stored locally on the computing device 161, e.g., in one or more non-transitory memory devices 163 thereof. In other embodiments, the library 166 can be stored offboard the wall-mounted self-checkout system 100, e.g., on a data store 170 as shown in FIG. 3. The computing device 161 can access the library 166 over a network 172, such as the internet. The computing device 161 can include a communication interface 168 that enables communication with over devices over the network 172 and also locally with other devices of the wall-mounted self-checkout system 100 via a communication bus 169. The communication interface 168 can include transmitter circuitry configured to send communication signals and receiver circuitry configured to receive communication signals. In this regard, the communication interface 168 can include transmitters, receivers, transceivers, etc. for communication over the network 172 and/or the communication bus 169. In yet other embodiments, the library 166 can be stored in part locally and in part remotely.

The computing device 161 is communicatively coupled with other devices/components of the wall-mounted self-checkout system 100 by way the communication bus 169, e.g., by one or more wired and/or wireless communication links. As depicted in FIG. 3, the computing device 161 can be communicatively coupled with the item scanner 120, the guidance lights 132, the display screen 144, the payment terminal 150, the lane light 146, the camera 148, the load cells 134, the printer, an accelerometer 174 (which can be embedded within the display screen 144), an accelerometer 180 (which can be embedded in a shelf of the wall-mounted self-checkout system), and a lane blocker 176. The computing device 161 can be located in any suitable location, such as behind the display screen 144. The computing device 161 can also be communicatively coupled with other devices, such as one or more speakers, user input devices, other light sources, offboard devices (such as offboard cameras, computing devices, sensors, etc.).

Detection of Tilt and/or Slant Events

In one or more examples, the wall-mounted self-checkout system 100 can be arranged to detect and address tilt and/or slant events. With reference now to FIGS. 1 through 7, an operation to detect and address tilt and/or slant events can be implemented by the wall-mounted self-checkout system 100 according to the process 200 depicted in the flow diagram of FIG. 4. In at least one example, the computing system 160 can, at least in part, implement the operation. As noted, the computing system 160 can include one or more processors and one or more memory devices that store a program, which, when executed, causes the one or more processors to, individually or collectively, perform an operation, e.g., an operation to detect and address tilt and/or slant events associated with the wall-mounted self-checkout system 100.

At 202, in performing the operation, the one or more processors can determine, based at least in part on received data, that at least one of: a tilt angle of the wall-mounted self-checkout system 100 achieves a predetermined tilt threshold; or a slant angle of the wall-mounted self-checkout system achieves a predetermined slant threshold.

Figure 5:
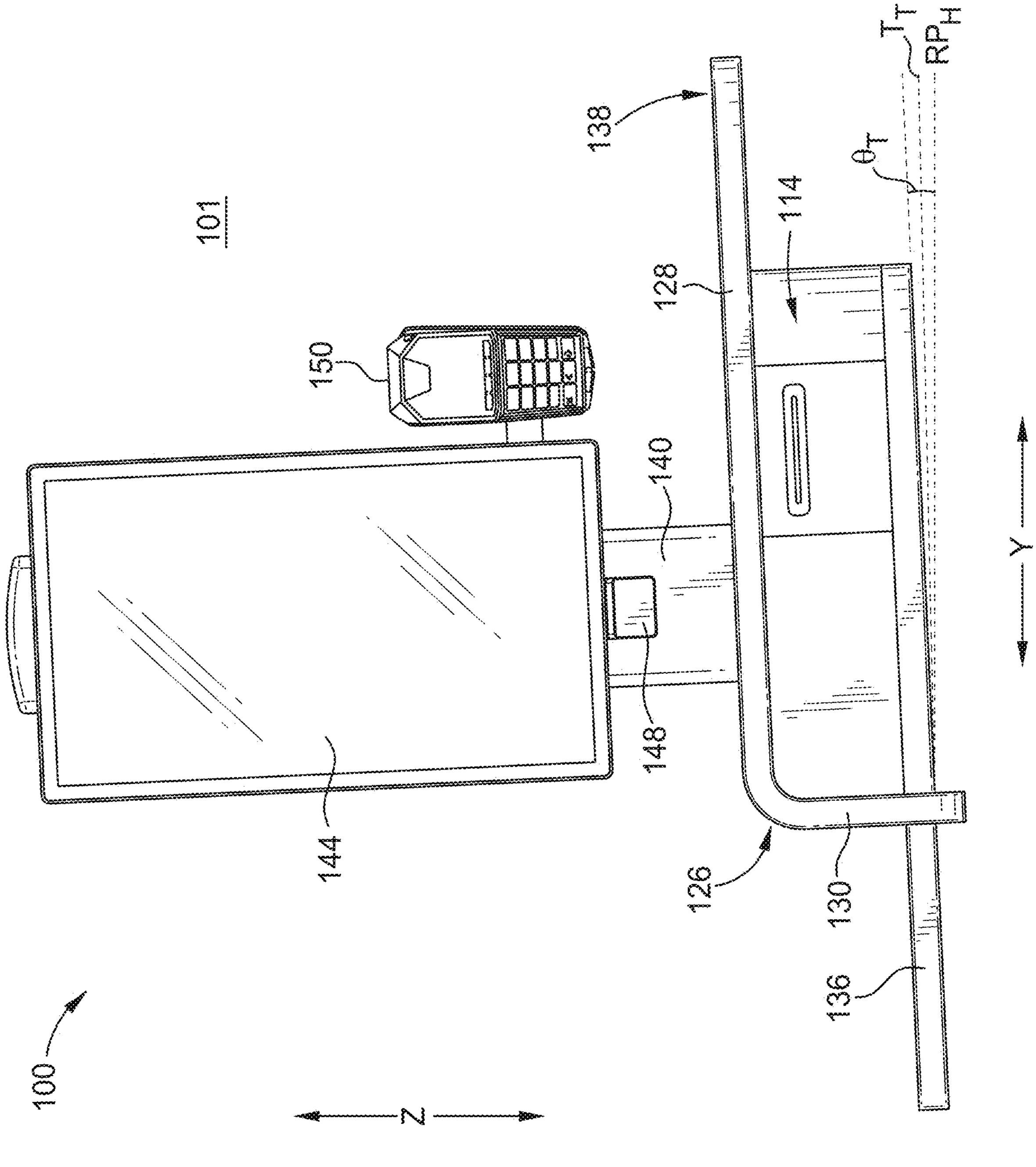
FIG. 5 depicts a front view of the wall-mounted self-checkout system of FIG. 1, with the wall-mounted self-checkout system tilted.

In one or more examples, as shown in FIG. 5, the wall-mounted self-checkout system 100 can experience a tilt event when the wall-mounted self-checkout system 100 is angled with respect to a horizontal reference plane $RP_H$ that is perpendicular to the wall 101 to which the wall-mounted self-checkout system 100 is mounted. The horizontal reference plane $RP_H$ extends in plane perpendicular to the Z-direction, or rather, in an XY plane. As shown in the example of FIG. 5, the wall-mounted self-checkout system 100 is tilted, and consequently, has a non-zero tilt angle $\theta_T$ with respect to the horizontal reference plane $RP_H$. In comparison, in FIG. 2, the wall-mounted self-checkout system 100 is not tilted, and thus, has a tilt angle $\theta_T$ of zero degrees (0°). The predetermined tilt threshold $T_T$ can be set at a non-zero tilt angle, e.g., three degrees (3°). In FIG. 5, the tilt threshold $T_T$ is represented by a dashed-dot line. Accordingly, at 202, the one or more processors can determine, based at least in part on received data (e.g., image data, accelerometer data, etc. as explained further below), that the tilt angle $\theta_T$ of the wall-mounted self-checkout system 100 achieves the predetermined tilt threshold $T_T$ as the tilt angle $\theta_T$ of the wall-mounted self-checkout system 100 exceeds the predetermined tilt threshold $T_T$.

Figure 7:
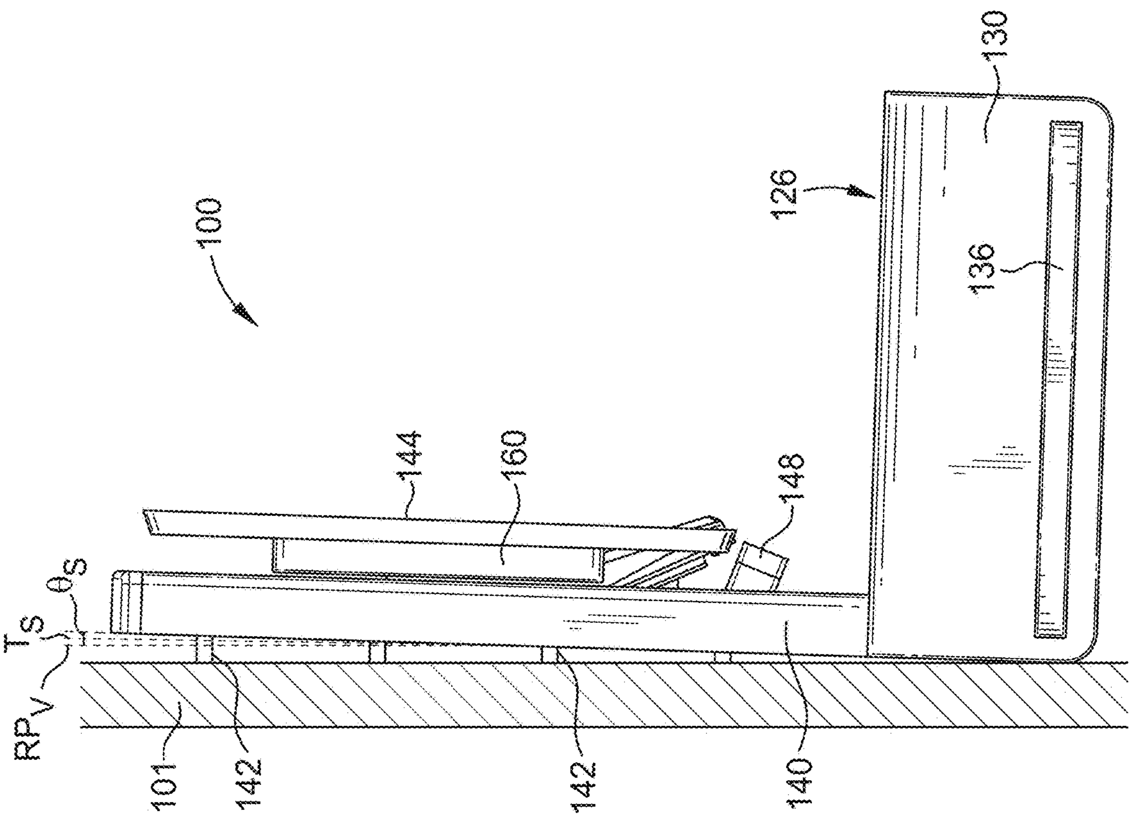
FIG. 7 depicts a side view of the wall-mounted self-checkout system of FIG. 1, with the wall-mounted self-checkout system slanted.

In one or more examples, as shown in FIG. 7, the wall-mounted self-checkout system 100 can experience a slant event when the wall-mounted self-checkout system 100 is angled with respect to a vertical reference plane $RP_V$ that is parallel to the wall 101 to which the wall-mounted self-checkout system 100 is mounted. The vertical reference plane $RP_V$ extends in plane perpendicular to the X-direction, or rather, in a YZ plane. As shown in the example of FIG. 7, the wall-mounted self-checkout system 100 is slanted, and consequently, has a non-zero slant angle $\theta_S$ with respect to the vertical reference plane $RP_V$. In comparison, in FIG. 6, the wall-mounted self-checkout system 100 is not slanted (or tilted), and thus, has a slant angle $\theta_S$ of zero degrees (0°). The predetermined slant threshold $T_S$ can be set at a non-zero slant angle, e.g., three degrees (3°). In FIG. 7, the slant threshold $T_S$ is represented by a dashed-dot line. Accordingly, at 202, the one or more processors can determine, based at least in part on received data (e.g., image data, accelerometer data, etc.), that the slant angle $\theta_S$ of the wall-mounted self-checkout system 100 achieves the predetermined slanted threshold $T_S$, namely because the slant angle $\theta_S$ of the wall-mounted self-checkout system 100 exceeds the predetermined slant threshold $T_S$.

In one or more examples, the received data used to determine whether the tilt angle achieves the predetermined tilt threshold and/or that the slant angle achieves the predetermined slant threshold can be image data captured by one or more cameras of the wall-mounted self-checkout system 100, such as the camera 148. In such examples, in determining, based at least in part on the received data, that the tilt angle achieves the predetermined tilt threshold and/or that the slant angle achieves the predetermined slant threshold, the one or more processors can receive a current image 178 (FIG. 3) of the wall-mounted self-checkout system 100 captured by the one or more cameras (e.g., by the camera 148). The current image 178 can be included in the data received by the one or more processors. Further, the one or more processors can receive a baseline image 167 (FIG. 3) of the wall-mounted self-checkout system 100 captured by the one or more cameras (e.g., by the camera 148). The baseline image 167 can be accessed from the library 166. The baseline image 167 can be captured when the tilt angle of the wall-mounted self-checkout system 100 was known to be in a predetermined range of a reference tilt angle or horizontal reference plane $RP_H$ (e.g., at a tilt angle of zero degrees (0°)) and when the slant angle of the wall-mounted self-checkout system 100 was known to be in a predetermined range of a reference slant angle or vertical reference plane $RP_V$ (e.g., at a slant angle of zero degrees (0°)). The baseline image 167 can be included in the data received by the one or more processors.

The one or more processors can determine at least one of: the tilt angle by comparing the current image 178 and the baseline image 167; or the slant angle by comparing the current image 178 and the baseline image 167. In performing the image comparison, which can be implemented by executing one or more computer vision algorithms or a machine-learned model (e.g., a convolutional neural network (CNN)), the one or more processors can detect or determine the tilt and/or slant angle of the wall-mounted self-checkout system 100. Accordingly, with the tilt angle and/or slant angle determined, the one or more processors can determine whether the tilt angle achieves the predetermined tilt threshold and/or whether the slant angle achieves the predetermined slant threshold.

In one or more examples, the display screen 144 has an accelerometer 174 mounted to, or embedded therein, as noted above. In such examples, in determining, based at least in part on the received data, that the tilt angle achieves the predetermined tilt threshold and/or that the slant angle achieves the predetermined slant threshold, the one or more processors can receive, from the accelerometer 174, an input indicative of the tilt angle and/or the slant angle. The input can be included in the data received by the one or more processors. Accordingly, with the tilt angle and/or slant angle received from the accelerometer 174, the one or more processors can determine whether the tilt angle achieves the predetermined tilt threshold and/or whether the slant angle achieves the predetermined slant threshold.

In at least one example, data from the accelerometer 174 and data received from the camera 148 and library 166 can be used to determine whether the tilt angle and/or slant angle achieves their respective thresholds. In other examples, the tilt angle and/or slant angle can be determined in other suitable manners, such as by offboard cameras (current versus baseline comparisons), inclination, tilt, and/or slant sensors mounted to the wall-mounted self-checkout system 100, etc.

In at least one example, the operation at 202 can be initiated periodically (e.g., based on a predetermined time interval) or based on a trigger condition being met.

In one example, determining that the tilt angle achieves the predetermined tilt threshold and/or that the slant angle achieves the predetermined slant threshold at 202 can be performed in response to an applied force to the wall-mounted self-checkout system 100 achieving a force threshold. The applied force can be measured by the accelerometer 174 mounted to, or embedded within, the display screen 144. For instance, if a shopping cart strikes the wall-mounted self-checkout system 100, the accelerometer 174 can measure the applied force, and when the applied force achieves the force threshold (e.g., is equal to or exceeds the force threshold), the operation can be commenced to check for tilting or slanting of the wall-mounted self-checkout system 100.

In another example, determining that the tilt angle achieves the predetermined tilt threshold and/or that the slant angle achieves the predetermined slant threshold at 202 can be performed in response to an applied force to the wall-mounted self-checkout system 100 achieving a force threshold, wherein the applied force is measured by the one or more load cells 134 of the item scanner 120 mounted to, or embedded within, the counter 126. For instance, if a relatively heavy object is placed on the item scanner 120 or platform thereof, and the applied force achieves the force threshold (e.g., is equal to or exceeds the force threshold), the operation at 202 can be commenced to check for tilting or slanting of the wall-mounted self-checkout system 100.

In a further example, determining that the tilt angle achieves the predetermined tilt threshold and/or that the slant angle achieves the predetermined slant threshold at 202 can be performed in response to one or more cameras capturing a predefined user gesture. Example predefined user gestures can include, without limitation, a user sitting on a shelf of the wall-mounted self-checkout system 100, a user slamming an item onto a shelf or the counter 126, a user running into a shelf with a shopping cart, etc. The camera 148 can capture such user gestures. Additionally or alternatively, one or more offboard cameras can capture such user gestures and can report the user gesture to the wall-mounted self-checkout system 100.

In yet a further example, determining that the tilt angle achieves the predetermined tilt threshold and/or that the slant angle achieves the predetermined slant threshold at 202 can be performed after each user transaction.

At 204, in performing the operation, the one or more processors can perform a control action in response to determining that the tilt angle has achieved the predetermined tilt threshold and/or that the slant angle has achieved the predetermined slant threshold.

In one or more examples, the control action can include physically blocking access to the wall-mounted self-checkout system 100. In at least one example, performing the control action can include moving a lane blocker 176 to physically close off the wall-mounted self-checkout system 100. The lane blocker 176 can be coupled, e.g., with the input shelf 136, and can be movable between a retracted position (shown in FIG. 2) and a deployed position in which the lane blocker 176 physically closes off the wall-mounted self-checkout system 100. In at least one example, the lane blocker 176 can include a pole or bar coupled with an actuator (e.g., an electrically-controlled actuator). The actuator can be controlled to selectively move the pole or bar outward from the input shelf 136, e.g., along the X-direction, and inward toward the input shelf 136, e.g., along the X-direction. In this regard, the lane blocker 176, or pole or bar thereof, can be movable between a retracted position and a deployed position in which the lane blocker 176 physically closes off the wall-mounted self-checkout system 100. In the retracted position, the lane blocker 176 can allow physical access to the wall-mounted self-checkout system 100, and can be retracted so as to be hidden from sight. For instance, the pole or bar can be retracted within a recess (FIG. 2) defined by the input shelf 136 or arranged underneath.

When a tilt and/or slant event occurs, one or more components of the wall-mounted self-checkout system 100 may be damaged or otherwise unsafe for users. Accordingly, the lane blocker 176 can be selectively deployed to prevent or urge users not to move in close proximity to the wall-mounted self-checkout system 100. In other examples, the lane blocker 176 can be arranged in a remote location, such as at an entrance of a lane or waiting area associated with the wall-mounted self-checkout system 100. In yet other examples, additionally or alternatively to a lane blocker coupled with the input shelf 136, the wall-mounted self-checkout system 100 can include a lane blocker coupled with the output shelf 138.

In some instances, the lane blocker 176 can be deployed upon confirming that a user is not present at the wall-mounted self-checkout system 100, e.g., so as not to strike the user with the lane blocker 176. In at least one example, the computing system 160 can place movement of the lane blocker 176 on "hold" until after a user as exited the area. In at least one example, a speaker of the wall-mounted self-checkout system 100 can produce a sound to warn users that the lane blocker 176 is being deployed or about to be deployed, which can increase safety. In at least one example, the lane blocker 176 can be deployed based on a magnitude of the deviation of the tilt angle with respect to the predetermined tilt threshold and/or based on a magnitude of the deviation of the slant angle with respect to the predetermined slant angle. For instance, the lane blocker 176 can be deployed upon determining that the tilt angle and/or slant angle has achieved a relatively extreme level beyond the noted thresholds.

In one or more examples, additionally or alternatively to any of the control actions noted above or below, the control action can include switching the wall-mounted self-checkout system 100 from a normal mode to some other mode, such as a shutdown mode or a standby mode. In at least one example, performing the control action can include changing the wall-mounted self-checkout system 100 from a normal mode to a standby mode in which functionality of the wall-mounted self-checkout system 100 is reduced compared to the normal mode, but is yet still operational. For instance, in the standby mode, the wall-mounted self-checkout system 100 can allow for a user to continue scanning items for purchase, but may put a hold on allowing the user to finish payment, e.g., to keep the user at the wall-mounted self-checkout system 100 so that an operator may inspect the wall-mounted self-checkout system 100 before the user leaves. In at least one example, performing the control action can include changing the wall-mounted self-checkout system 100 from a normal mode to a shutdown mode in which functionality of the wall-mounted self-checkout system 100 is turned off.

In at least one example, the wall-mounted self-checkout system 100 is switched from the normal mode to the either the standby mode or the shutdown mode based on a magnitude of the deviation of the tilt angle and/or slant angle from their respective thresholds. For instance, when the tilt angle and/or slant angle is in a first range, the wall-mounted self-checkout system 100 can be switched from the normal mode to the standby mode, and when the tilt angle and/or slant angle is in a second range, the wall-mounted self-checkout system 100 can be switched from the normal mode to the shutdown mode. The first range can be associated with lower deviations than the second range.

In one or more examples, additionally or alternatively to any of the control actions noted above or below, performing the control action can include automatically performing recalibration of the load cell 134 of the item scanner 120. In such examples, during recalibration of the load cell 134, performing the control action can include changing a mode of operation of the wall-mounted self-checkout system 100 that prevents a user from scanning items that are priced by weight. In such an example, the wall-mounted self-checkout system 100 can switch to a mode of operation (e.g., the normal mode) that allows a user to scan items that are priced by weight when the recalibration process has completed successfully.

In one or more examples, additionally or alternatively to any of the control actions noted above, performing the control action can include automatically communicating to an operator that that the wall-mounted self-checkout system 100 has experienced a tilt event and/or a slant event. The communication provided to the operator can be an audible communication (e.g., output by a speaker of the wall-mounted self-checkout system 100), a light signal (e.g., the lane light 146 and/or guidance lights 132 can flash a certain color and/or at a predetermined frequency), a digital signal (e.g., sent to an operator's system), a combination thereof, etc. In at least one example, the operator can be a sales associate. In at least one example, the operator can be a maintenance person. The maintenance person can receive the communication instructing that assistance is needed to check or fix the mounting of the wall-mounted self-checkout system 100 to the wall 101.

Detection of Shelf Tilt Events

In one or more examples, the wall-mounted self-checkout system 100 can be arranged to detect and address tilt and/or damage events associated with a shelf of the wall-mounted self-checkout system 100. With reference now to FIGS. 1 through 3 and 8 through 10, an operation to detect and address tilt events associated with a shelf of the wall-mounted self-checkout system 100 can be implemented by the wall-mounted self-checkout system 100 according to the process 300 depicted in the flow diagram of FIG. 8. In at least one example, the computing system 160 can, at least in part, implement the operation. As noted, the computing system 160 can include one or more processors and one or more memory devices that store a program, which, when executed, causes the one or more processors to, individually or collectively, perform an operation, e.g., an operation to detect and address tilt events associated with a shelf of the wall-mounted self-checkout system 100.

At 302, in performing the operation, the one or more processors can determine, based at least in part on received data, that a tilt angle of the shelf achieves a predetermined tilt threshold.

Figure 9:
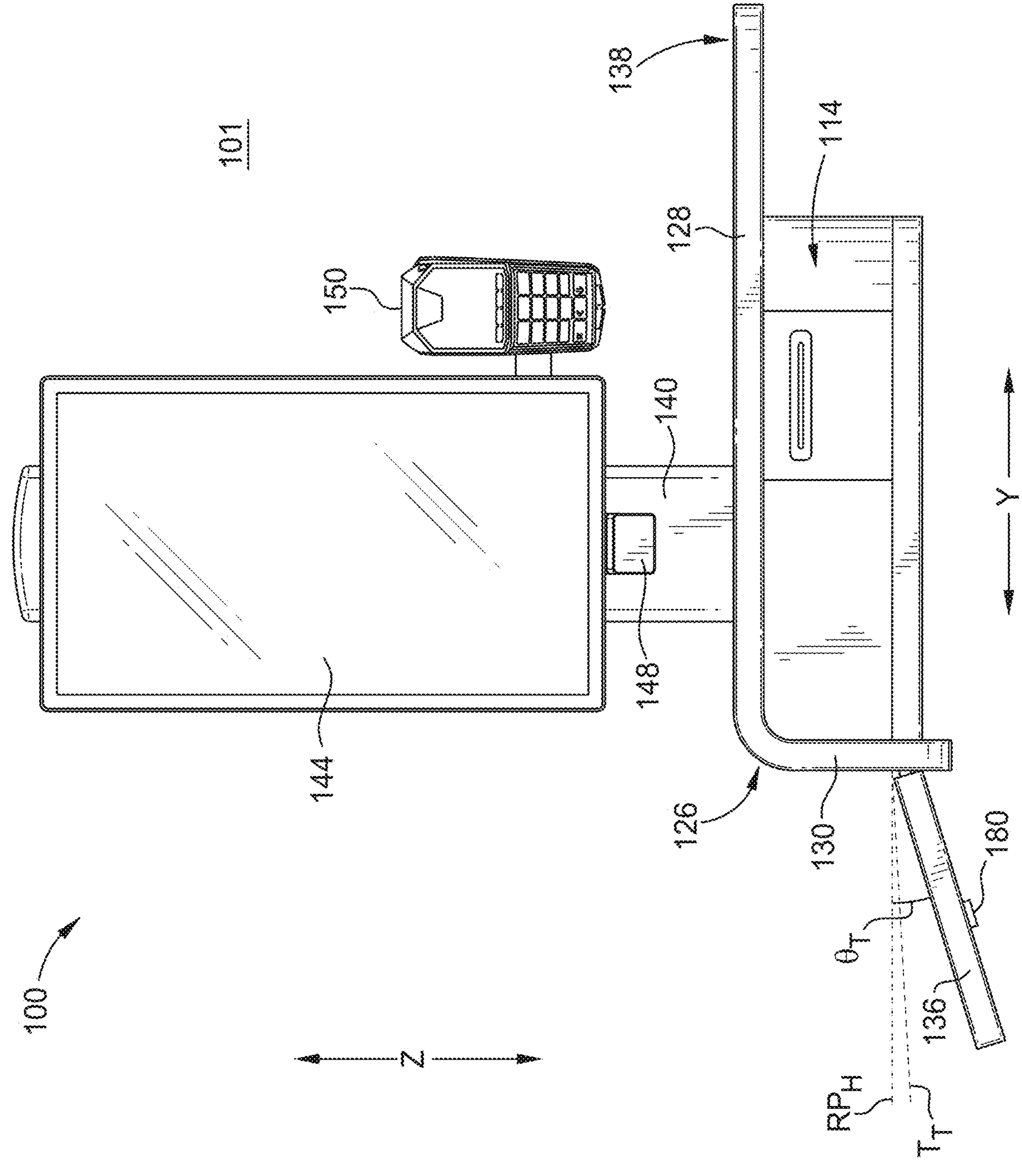
FIG. 9 depicts a front view of the wall-mounted self-checkout system of FIG. 1, with an input shelf of the wall-mounted self-checkout system oriented with tilt.

In at least one example, the input shelf 136 cantilevered from the vertical panel 130 can experience a tilt event. As depicted in FIG. 9, the input shelf 136 is angled with respect to a horizontal reference plane $RP_H$, which is perpendicular to the wall 101 to which the wall-mounted self-checkout system 100 is mounted. Accordingly, the input shelf 136 is tilted and has a non-zero tilt angle $\theta_T$ with respect to the horizontal reference plane $RP_H$. In comparison, in FIG. 2, the input shelf 136 is not tilted, and thus, has a tilt angle $\theta_T$ of zero degrees (0°). The predetermined tilt threshold $T_T$ can be set at a non-zero tilt angle, e.g., five degrees (5°). In FIG. 9, the tilt threshold $T_T$ is represented by a dashed-dot line. Accordingly, at 302, the one or more processors can determine, based at least in part on received data (e.g., image data, accelerometer data, etc. as explained further below), that the tilt angle $\theta_T$ of the input shelf 136 achieves the predetermined tilt threshold $T_T$, namely because the tilt angle $\theta_T$ of the input shelf 136 exceeds the predetermined tilt threshold $T_T$. In at least one example, the tilt angle $\theta_T$ of the input shelf 136 achieving the predetermined tilt threshold $T_T$ can be an indication that the input shelf 136 is broken, damaged, or otherwise unfit for service.

Figure 10:
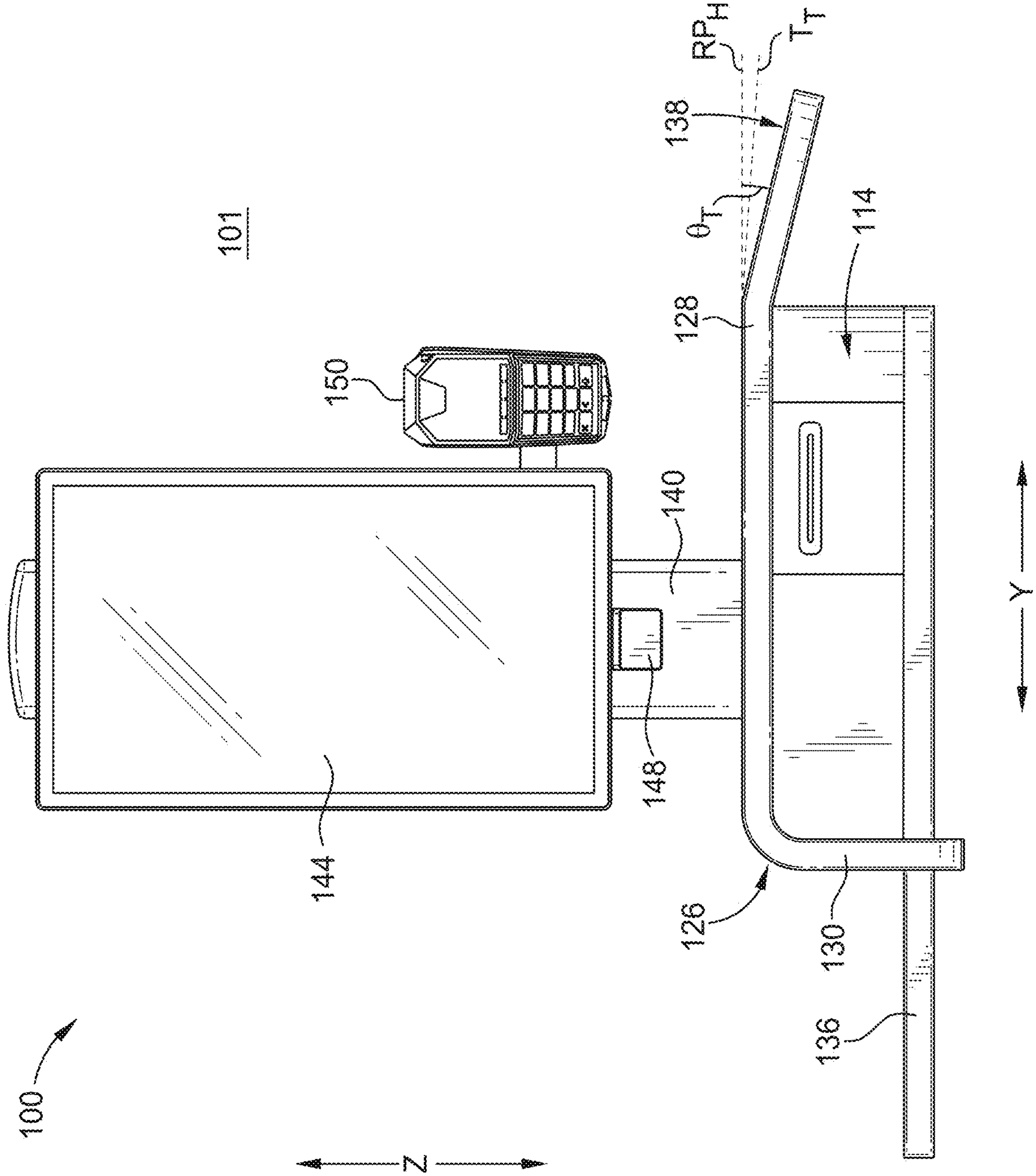
FIG. 10 depicts a front view of the wall-mounted self-checkout system of FIG. 1, with an output shelf of the wall-mounted self-checkout system oriented with tilt.

In at least one example, the output shelf 138, which is a portion of the horizontal panel 128 that is cantilevered, can experience a tilt event. The output shelf 138 is the portion of the horizontal panel 128 under which the housing 114 is not positioned. As depicted in FIG. 10, the output shelf 138 is angled with respect to a horizontal reference plane $RP_H$, which is perpendicular to the wall 101 to which the wall-mounted self-checkout system 100 is mounted. Accordingly, the output shelf 138 is tilted and has a non-zero tilt angle $\theta_T$ with respect to the horizontal reference plane $RP_H$. In comparison, in FIG. 2, the output shelf 138 is not tilted, and thus, has a tilt angle $\theta_T$ of zero degrees (0°). The predetermined tilt threshold $T_T$ can be set at a non-zero tilt angle, e.g., five degrees (5°). In FIG. 10, the tilt threshold $T_T$ is represented by a dashed-dot line. Accordingly, at 302, the one or more processors can determine, based at least in part on received data (e.g., image data, accelerometer data, etc.), that the tilt angle $\theta_T$ of the output shelf 138 achieves the predetermined tilt threshold $T_T$, namely because the tilt angle $\theta_T$ of the output shelf 138 exceeds the predetermined tilt threshold $T_T$. In at least one example, the tilt angle $\theta_T$ of the output shelf 138 achieving the predetermined tilt threshold $T_T$ can be an indication that the output shelf 138 is broken, damaged, or otherwise unfit for service.

In one or more examples, the received data used to determine whether the tilt angle achieves the predetermined tilt threshold can be image data captured by one or more cameras of the wall-mounted self-checkout system 100, such as the camera 148. In such examples, in determining, based at least in part on the received data, that the tilt angle achieves the predetermined tilt threshold, the one or more processors can receive a current image 178 (FIG. 3) of the shelf captured by the one or more cameras (e.g., by the camera 148). The current image 178 can be included in the data received by the one or more processors. Further, the one or more processors can receive a baseline image 167 (FIG. 3) of the shelf captured by the one or more cameras (e.g., by the camera 148). The baseline image 167 can be accessed from the library 166. The baseline image 167 can be captured when the tilt angle of the shelf was known to be in a predetermined range of a reference tilt angle or horizontal reference plane $RP_H$ (e.g., at a tilt angle of zero degrees (0°)). The baseline image 167 can be included in the data received by the one or more processors.

The one or more processors can determine the tilt angle by comparing the current image 178 and the baseline image 167. In performing the image comparison, which can be implemented by executing one or more computer vision algorithms or a machine-learned model (e.g., a CNN), the one or more processors can detect or determine the tilt angle of the shelf. Accordingly, with the tilt angle determined, the one or more processors can determine whether the tilt angle achieves the predetermined tilt threshold.

In one or more examples, the shelf can have a tilt sensor mounted to, or embedded therein. For instance, in the example of FIG. 9, the input shelf 136 has an accelerometer 180 mounted thereto. In such examples, the determining, based at least in part on the received data, that the tilt angle of the shelf achieves the predetermined tilt threshold can include receiving, from the accelerometer 180, an input indicative of the tilt angle of the shelf (e.g., the input shelf 136). The input can be included in the received data. Accordingly, with the tilt angle received from the accelerometer 180, the one or more processors can determine whether the tilt angle achieves the predetermined tilt threshold. In yet other examples, the output shelf 138 can have an accelerometer mounted to, or embedded therein.

In at least one example, data from the accelerometer 180 and data received from the camera 148 and library 166 can be used to determine whether the tilt angle achieves the threshold. In other examples, the tilt angle can be determined in other suitable manners, such as by offboard cameras (current versus baseline comparisons), other sensors mounted to the wall-mounted self-checkout system 100, etc.

In at least one example, the operation at 302 can be initiated periodically (e.g., based on a predetermined time interval) or based on a trigger condition being met, such as any of the trigger conditions described above with respect to 202 Accordingly, for the sake of brevity, the example trigger conditions will not be described here.

At 304, in performing the operation, the one or more processors can perform a control action in response to determining that the tilt angle has achieved the predetermined tilt threshold. One or more of the control actions described above with respect to 204 can be implemented for 304 to address the tilt event associated with the shelf, including any combination thereof. Accordingly, for the sake of brevity, the example control actions will not be described here. Further, in one or more examples, the wall-mounted self-checkout system 100 can monitor for slant events associated with one or more shelves thereof.

In one or more further examples, a non-transitory computer-readable medium can be provided. The non-transitory computer-readable medium can have computer-readable program code embodied therewith, the computer-readable program code executable by one or more processors of a wall-mounted self-checkout system to: determine, based at least in part on received data, that at least one of: a tilt angle of the wall-mounted self-checkout system or a component thereof achieves a predetermined tilt threshold; or a slant angle of the wall-mounted self-checkout system or a component thereof achieves a predetermined slant threshold; and perform a control action in response to determining at least one: the tilt angle has achieved the predetermined tilt threshold; or the slant angle has achieved the predetermined slant threshold. The received data can include image data (e.g., a current image and a baseline image of image comparison purposes), data from a tilt sensor or accelerometer, etc. In executing the program code, the tilt and/or slant of the wall-mounted self-checkout system can be considered or a component thereof can be monitored for tilting and/or slanting. For instance, a shelf of the wall-mounted self-checkout system can be considered. When tilting and/or slanting of the wall-mounted self-checkout system or component thereof achieves a threshold level, a control action (e.g., any of the control actions described herein, and in any combination) can be performed to address the tilting and/or slanting of the unit or component.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to the described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not an advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the described embodiments may take the form of an entirely hardware embodiment, an entirely software embodiment (including firmware, resident software, microcode, etc.) or an embodiment combining software and hardware aspects that may generally be referred to herein as a "circuit," "module" or "system."

One or more of the described embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the described embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the described embodiments.

Aspects of the described embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a described manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to one or more embodiments, other and further embodiments may be devised without departing from the basic scope thereof, and the scope thereof is determined by the claims that follow.

What is claimed is:

1. A wall-mounted self-checkout system, comprising:

a housing;

a counter having a horizontal panel and a vertical panel connected thereto, wherein the horizontal panel is seated on the housing;

a shelf mounted to the vertical panel;

a tower extending upwards relative to the counter and having one or more mounts for mounting the wall-mounted self-checkout system to a wall; and a computing system having one or more processors and one or more memory devices storing a program, which, when executed, causes the one or more processors to, individually or collectively, perform an operation, comprising:

determining, based at least in part on received data, that at least one of: a tilt angle of the wall-mounted self-checkout system achieves a predetermined tilt threshold; or a slant angle of the wall-mounted self-checkout system achieves a predetermined slant threshold; and performing a control action in response to determining at least one of: the tilt angle has achieved the predetermined tilt threshold; or the slant angle has achieved the predetermined slant threshold.

2. The wall-mounted self-checkout system of claim 1, further comprising:

one or more cameras, and wherein determining, based at least in part on the received data, that at least one of: the tilt angle of the wall-mounted self-checkout system achieves the predetermined tilt threshold; or the slant angle of the wall-mounted self-checkout system achieves the predetermined slant threshold comprises:

receiving a current image of the wall-mounted self-checkout system captured by the one or more cameras, the current image being included in the received data;

receiving a baseline image of the wall-mounted self-checkout system captured by the one or more cameras when the tilt angle of the wall-mounted self-checkout system was known to be in a predetermined range of a reference tilt angle and when the slant angle of the wall-mounted self-checkout system was known to be in a predetermined range of a reference slant angle, the baseline image being included in the received data; and determining at least one of: the tilt angle by comparing the current image and the baseline image; or the slant angle by comparing the current image and the baseline image.

3. The wall-mounted self-checkout system of claim 1, further comprising:

a display screen mounted to the tower and having an accelerometer mounted to, or embedded therein, and wherein determining, based at least in part on the received data, that at least one of: the tilt angle of the wall-mounted self-checkout system achieves the predetermined tilt threshold; or the slant angle of the wall-mounted self-checkout system achieves the predetermined slant threshold comprises:

receiving, from the accelerometer, an input indicative of at least one of: the tilt angle; or the slant angle, the input being included in the received data, and wherein at least one of: the tilt angle received from the accelerometer is compared to the predetermined tilt threshold; or the slant angle received from the accelerometer is compared to the predetermined slant threshold.

4. The wall-mounted self-checkout system of claim 1, wherein determining that at least one of: the tilt angle of the wall-mounted self-checkout system achieves the predetermined tilt threshold; or the slant angle of the wall-mounted self-checkout system achieves the predetermined slant threshold is performed according to at least one of: a predetermined time interval; or after every user transaction.

5. The wall-mounted self-checkout system of claim 1, wherein determining that at least one of: the tilt angle of the wall-mounted self-checkout system achieves the predetermined tilt threshold; or the slant angle of the wall-mounted self-checkout system achieves the predetermined slant threshold is performed in response to an applied force to the wall-mounted self-checkout system achieving a force threshold, wherein the applied force is measured by an accelerometer mounted to, or embedded within, a display screen mounted to the tower.

6. The wall-mounted self-checkout system of claim 1, wherein determining that at least one of: the tilt angle of the wall-mounted self-checkout system achieves the predetermined tilt threshold; or the slant angle of the wall-mounted self-checkout system achieves the predetermined slant threshold is performed in response to an applied force to the wall-mounted self-checkout system achieving a force threshold, wherein the applied force is measured by one or more load cells of an item scanner mounted to, or embedded within, the counter.

7. The wall-mounted self-checkout system of claim 1, wherein determining that at least one of: the tilt angle of the wall-mounted self-checkout system achieves the predetermined tilt threshold; or the slant angle of the wall-mounted self-checkout system achieves the predetermined slant threshold is performed in response to one or more cameras capturing a predefined user gesture.

8. The wall-mounted self-checkout system of claim 1, wherein the wall-mounted self-checkout system does not physically touch a ground.

9. The wall-mounted self-checkout system of claim 1, wherein performing the control action comprises moving a lane blocker to physically close off the wall-mounted self-checkout system, wherein the lane blocker is coupled with the shelf and is movable between a retracted position and a deployed position in which the lane blocker physically closes off the wall-mounted self-checkout system.

10. The wall-mounted self-checkout system of claim 1, wherein performing the control action comprises changing the wall-mounted self-checkout system from a normal mode to a standby mode in which functionality of the wall-mounted self-checkout system is reduced compared to the normal mode or to a shutdown mode in which the functionality of the wall-mounted self-checkout system is shut off.

11. The wall-mounted self-checkout system of claim 10, wherein the wall-mounted self-checkout system is changed to the standby mode or to the shutdown mode based at least in part on at least one of: a magnitude of a deviation of the tilt angle with respect to the predetermined tilt threshold; or a magnitude of a deviation of the slant angle with respect to the predetermined slant threshold.

12. The wall-mounted self-checkout system of claim 1, further comprising:

an item scanner having a load cell, and wherein performing the control action comprises automatically performing recalibration of the load cell of the item scanner.

13. The wall-mounted self-checkout system of claim 12, wherein, during recalibration of the load cell, performing the control action further comprises changing a mode of operation of the wall-mounted self-checkout system that prevents a user from scanning items that are priced by weight.

14. The wall-mounted self-checkout system of claim 1, wherein performing the control action comprises automatically communicating to an operator that that the wall-mounted self-checkout system has experienced at least one of a tilt event or a slant event.

15. A wall-mounted self-checkout system, comprising:

a housing;

a counter having a horizontal panel and a vertical panel connected thereto, wherein the horizontal panel is seated on the housing and the vertical panel encloses a side of the housing;

a shelf; and a computing system having one or more processors and one or more memory devices storing a program, which, when executed, causes the one or more processors to, individually or collectively, perform an operation, comprising:

determining, based at least in part on received data, that a tilt angle of the shelf achieves a predetermined tilt threshold; and performing a control action in response to determining that the tilt angle has achieved the predetermined tilt threshold.

16. The wall-mounted self-checkout system of claim 15, further comprising:

an input shelf cantilevered from the vertical panel, wherein the shelf is the input shelf.

17. The wall-mounted self-checkout system of claim 15, wherein at least a portion of the horizontal panel is cantilevered to form an output shelf, and wherein the shelf is the output shelf.

18. The wall-mounted self-checkout system of claim 15, further comprising:

one or more cameras, and wherein determining, based at least in part on the received data, that the tilt angle of the shelf achieves the predetermined tilt threshold comprises:

receiving a current image of the shelf captured by the one or more cameras, the current image being included in the received data;

receiving a baseline image of the shelf captured by the one or more cameras when the tilt angle of the shelf was known to be in a predetermined range of a reference tilt angle, the baseline image being included in the received data; and determining the tilt angle by comparing the current image and the baseline image.

19. The wall-mounted self-checkout system of claim 15, wherein the shelf has an accelerometer mounted to, or embedded therein, and wherein determining, based at least in part on the received data, that the tilt angle of the shelf achieves the predetermined tilt threshold comprises:

receiving, from the accelerometer, an input indicative of the tilt angle of the shelf, the input being included in the received data, and wherein the tilt angle received from the accelerometer is compared to the predetermined tilt threshold.

20. A non-transitory computer-readable medium having computer-readable program code embodied therewith, the computer-readable program code executable by one or more processors of a wall-mounted self-checkout system to:

determine, based at least in part on received data, that at least one of: a tilt angle of the wall-mounted self-checkout system or a component thereof achieves a predetermined tilt threshold; or a slant angle of the wall-mounted self-checkout system or a component thereof achieves a predetermined slant threshold; and perform a control action in response to determining at least one of: the tilt angle has achieved the predetermined tilt threshold; or the slant angle has achieved the predetermined slant threshold.

* * * * *